United States Patent [19]

Nekola et al.

[11] Patent Number: 4,890,972

[45] Date of Patent: Jan. 2, 1990

[54] QUICK CONNECT/DISCONNECT WHEEL CRADLE ARRANGEMENT FOR WHEEL LIFT TOWING SYSTEMS

[75] Inventors: Randy A. Nekola, Soddy, Tenn.; Fleming V. Cannon, Jr., Flintstone, Ga.

[73] Assignee: Century Wrecker Corporation, Ooltewah, Tenn.

[21] Appl. No.: 213,875

[22] Filed: Jun. 30, 1988

[51] Int. Cl.⁴ .............................................. B60P 3/12
[52] U.S. Cl. .................................... 414/563; 280/402; 403/254
[58] Field of Search .................... 414/563; 280/402; 403/252–254

[56] References Cited

U.S. PATENT DOCUMENTS

| | | | |
|---|---|---|---|
| 3,189,829 | 5/1965 | Wagner | 414/563 |
| 4,498,835 | 2/1985 | Yasue et al. | 403/254 X |
| 4,637,623 | 1/1987 | Bubik | 414/563 X |
| 4,737,066 | 4/1988 | Allison, Jr. | 414/563 |
| 4,741,661 | 5/1988 | Carey | 414/563 |
| 4,775,285 | 10/1988 | Zackovich | 414/563 |
| 4,793,763 | 12/1988 | Bubik | 414/563 |

*Primary Examiner*—David A. Bucci
*Attorney, Agent, or Firm*—Harness, Dickey & Pierce

[57] ABSTRACT

Wheel cradles for a wheel lift towing system are quickly and easily coupled to or uncoupled from opposing ends of a cross arm assembly associated with a towing vehicle. The cradles are coupled to the cross arm by sliding the cradles laterally inward in a substantially horizontal plane from outside the ends of the cross arm. Such lateral insertion facilitates coupling of the wheel cradles to the cross arm in situations of difficult access to the towed vehicles wheels. The cradles are decoupled from the cross arm by sliding the cradles laterally outward in a substantially horizontal plane following concurrent rotation of a pivotable latching member and depressible plunger release mechanism. Such concurrent actuation prevents premature decoupling of the wheel cradles during operation of the towing vehicle.

16 Claims, 4 Drawing Sheets

4,890,972

QUICK CONNECT/DISCONNECT WHEEL CRADLE ARRANGEMENT FOR WHEEL LIFT TOWING SYSTEMS

BACKGROUND OF THE INVENTION

The invention relates generally to wheel engaging apparatus for use with vehicle towing systems. More specifically, the invention concerns wheel cradles for towing systems wherein the towed vehicle is lifted and towed principally by its wheels.

The concept of using detachable, inwardly facing L-shaped wheel cradles in a wheel lift towing system was first introduced in U.S. Pat. No. 4,679,978 - Holmes et al., assigned to the same assignee as this invention. So-called "wheel lift" towing approaches avoid the need for the conventional tow truck sling assembly by using wheel engaging structures or "wheel cradles" which engage the front or rear wheels of a vehicle to be towed to lift the wheels and therefore one end of the vehicle substantially without engaging any other portion of the vehicle. The '978 - Holmes et al. patent disclosed such a wheel lift tow assembly mounted to the frame at the rear of a tow vehicle and moveable vertically. The tow assembly of the Holmes et al. disclosure included a telescopic tow bar extended and retracted from the rear of the vehicle and a cross bar pivotally mounted intermediate its ends about an upwardly extending axis to a rear portion of the telescopic tow bar. L-shaped wheel cradles were releasably connected to end portions of the cross arm in the Homes et al. patent.

U.S. Pat. No. 4,637,623 - Bubik discloses a later version of a wheel lift towing assembly using substantially L-shaped removable wheel cradles having the capability for pivoting in a horizontal plane from a laterally remote position spaced outwardly from the sides of the vehicle to be towed.

However, the Bubik arrangement requires insertion of the wheel cradle into coupling devices associated with the cross arm in a direction substantially perpendicular to a longitudinal axis of the cross arm—i.e., in a direction substantially parallel to the longitudinal axis of the towed vehicle. This required insertion approach makes cradle attachment to the cross arm of the towing vehicle difficult when obstructions prevent adequate clearance immediately adjacent the outside lateral surfaces of the wheels to be engaged.

While known systems employ insertion of the wheel cradle parallel to a longitudinal axis of the cross arm, such system utilize an extra cradle side arm extension extending parallel to the cross bar axis for insertion into a cross arm slot.

SUMMARY OF THE INVENTION

Accordingly, it is an object of this invention to furnish apparatus enabling facile connection and disconnection of a wheel cradle from the cross arm of a wheel lift towing system.

In a wheel lift towing system associated with a towing vehicle, towed wheel engaging apparatus comprises a cross arm assembly coupled to the towing vehicle and having first and second portions for engaging respective first portions of circumferentially extending road engaging surfaces of first and second wheels of a vehicle to be towed. First and second wheel cradle members each having a side arm member coupled to a transversely extending wheel engaging shoe member for engaging respective second portions of the circumferentially extending surfaces are respectively coupled to opposite ends of the cross arm assembly via first and second coupling members such that each wheel cradle member may be releasably coupled to its respective cross arm assembly end via a lateral sliding action of the side arm member substantially parallel to a longitudinal axis of the cross arm assembly while the side arm member extends transversely to said longitudinal axis, thereby placing the side arm member adjacent an outer side surface of a towed wheel. Each of the first and second coupling members include sockets on one of an end of the cross arm assembly and a lateral peripheral surface of the side arm member, each socket including an opening shaped for receipt of one of said lateral peripheral surface of an associated side arm and an end portions of the cross assembly.

The socket for receipt of the side arm is provided with a guide member and a spring-biased latching member so as to promote quick "snap-locked" connection of the wheel cradle member to its respective coupling member. Further, each respective coupling member is provided with a latching member release lever and a plunger mechanism operatively associated such that the wheel cradle members cannot be disconnected from their respective coupling member sockets without concurrent actuation of the release lever and plunger mechanism, thereby preventing premature disconnection during operation of the towing apparatus.

BRIEF DESCRIPTION OF THE DRAWINGS

These and other objects and features of the invention will become apparent from the reading of a detailed description taken in conjunction with the drawings, in which:

FIG. 7 is a cross sectional end view of the latching mechanism, taken along line A—A of FIG. 4.

DETAILED DESCRIPTION

Figure 1:
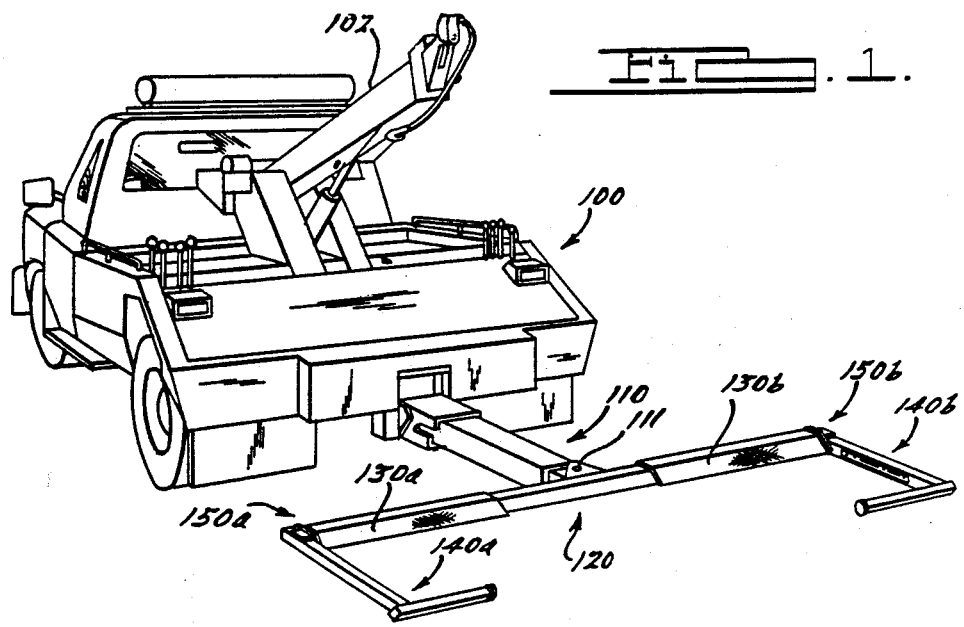
FIG. 1 is a perspective view taken from the rear of a towing vehicle showing the general environmental use of wheel cradles designed in accordance with the principles of the invention.

A typical wheel lift towing system with which the apparatus of the invention may conveniently be used is set forth in FIG. 1. Low rear end profile tow truck 100 includes an optional conventional boom with a cable and winch assembly 102 which is neither necessary nor pertinent to the invention. However, many present day tow trucks continue to employ such a conventional boom in addition to a tow-bar lift system.

Extending from the bottom of the truck chassis at its rear end is a telescoping tow bar or "stinger" 110 as disclosed, for example, in U.S. Pat. No. 4,679,978 - Holmes et al. referenced above. Coupled to a rear end of boom 110 via a vertically extending pivoting axis 111 is a cross arm assembly 120. Cross arm assembly 120 carries at its opposed ends approach plates 130a and 130b which are backed into abutting engagement with two wheels of the vehicle to be towed. Coupled to each end of the cross arm assembly 120 adjacent to approach plates 130a and 130b are substantially L-shaped wheel cradle members 140a and 140b. Cradle members 140a and 140b are removably coupled to cross arm assembly 120 via respective socket assemblies 150a and 150b which, in the illustrative embodiment, are welded to end portions of approach plates 130a and 130b and to an outer tube portion of cross arm assembly 120 adjacent approach plates 130a and 130b.

Figure 2:
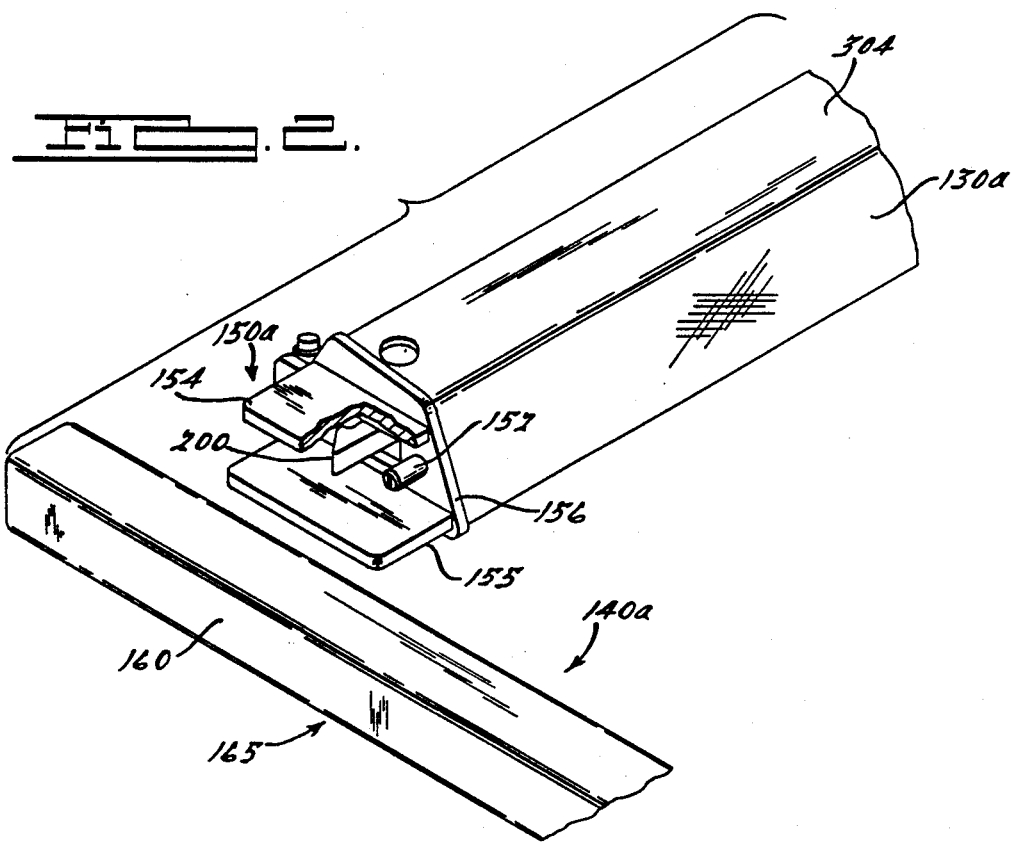
FIG. 2 is an exploded perspective view of a wheel cradle member and coupling member designed in accordance with the principles of the invention.
Figure 2:
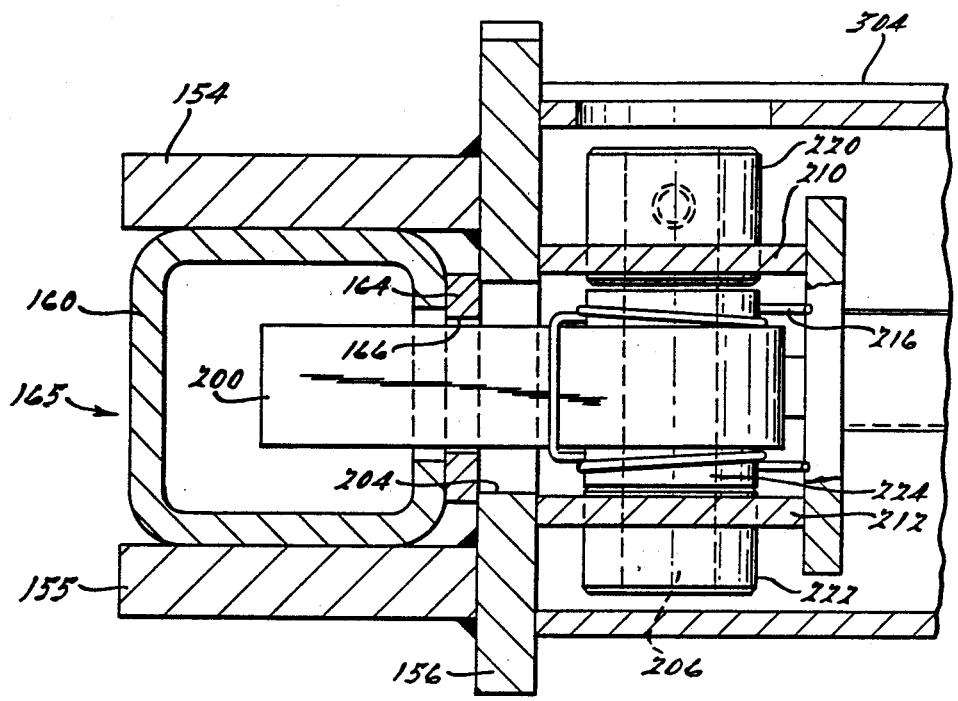
Figure 3:
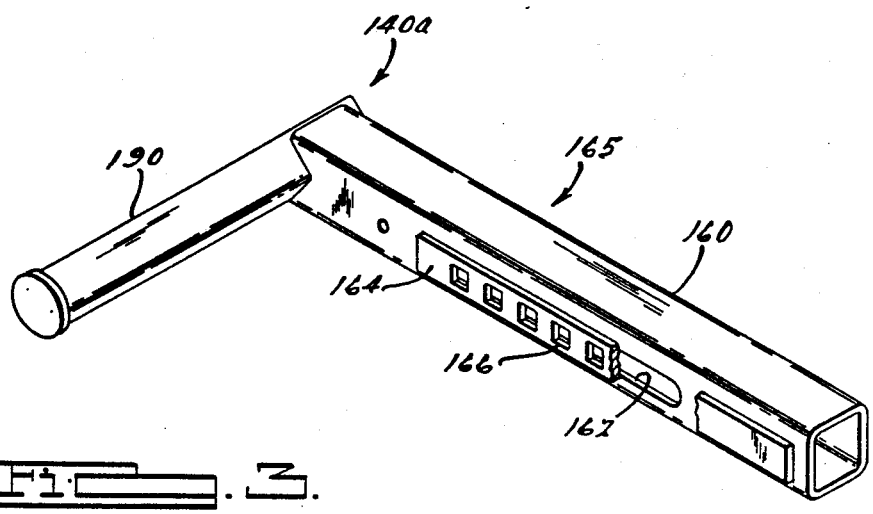
FIG. 3 is a perspective view of the substantially L-shaped wheel cradle designed in accordance with the principles of the invention.

Wheel cradle member 140a of FIG. 1 is shown in an exploded perspective view in FIG. 2. As seen from FIGS. 2 and 3, wheel cradle member 140a is comprised of a side arm member 165 extending transversely of cross arm assembly 120 and coupled at its end remote from the cross arm assembly to a wheel support member 190. Side arm member 165 consists of an outer tube 160 having a slot 162 through one peripheral wall. Welded over the slotted surface of the outer tube 160 is a latching plate 164 which defines a series of equally spaced square positioning holes 166. The end of the outer tube 160 is welded to the wheel support member 190, thereby defining the substantially L-shaped wheel cradle member 140a. In FIG. 3, the substantially L-shaped wheel cradle member is shown in greater detail. The adjacent spacing and dimensions of the square positioning holes 166 of the latching plate 164 welded to the outer tube 160 are developed so as to generate "snap-lock" action of the latch 200 upon coupling and clearance for latch disengagement during disconnection.

The cradle member 140a is removably coupled to an end of cross arm assembly 120 adjacent approach plate 130a via a socket assembly 150a. Socket 150a is comprised of a top plate member 154, a bottom plate member 155 and end plate member 156 interconnected as shown to form a substantially rectanguloid socket having a laterally outwardly facing opening for sliding receipt in a laterally inward direction of the near end of outer tube 160 of the side arm 165.

Figure 4:
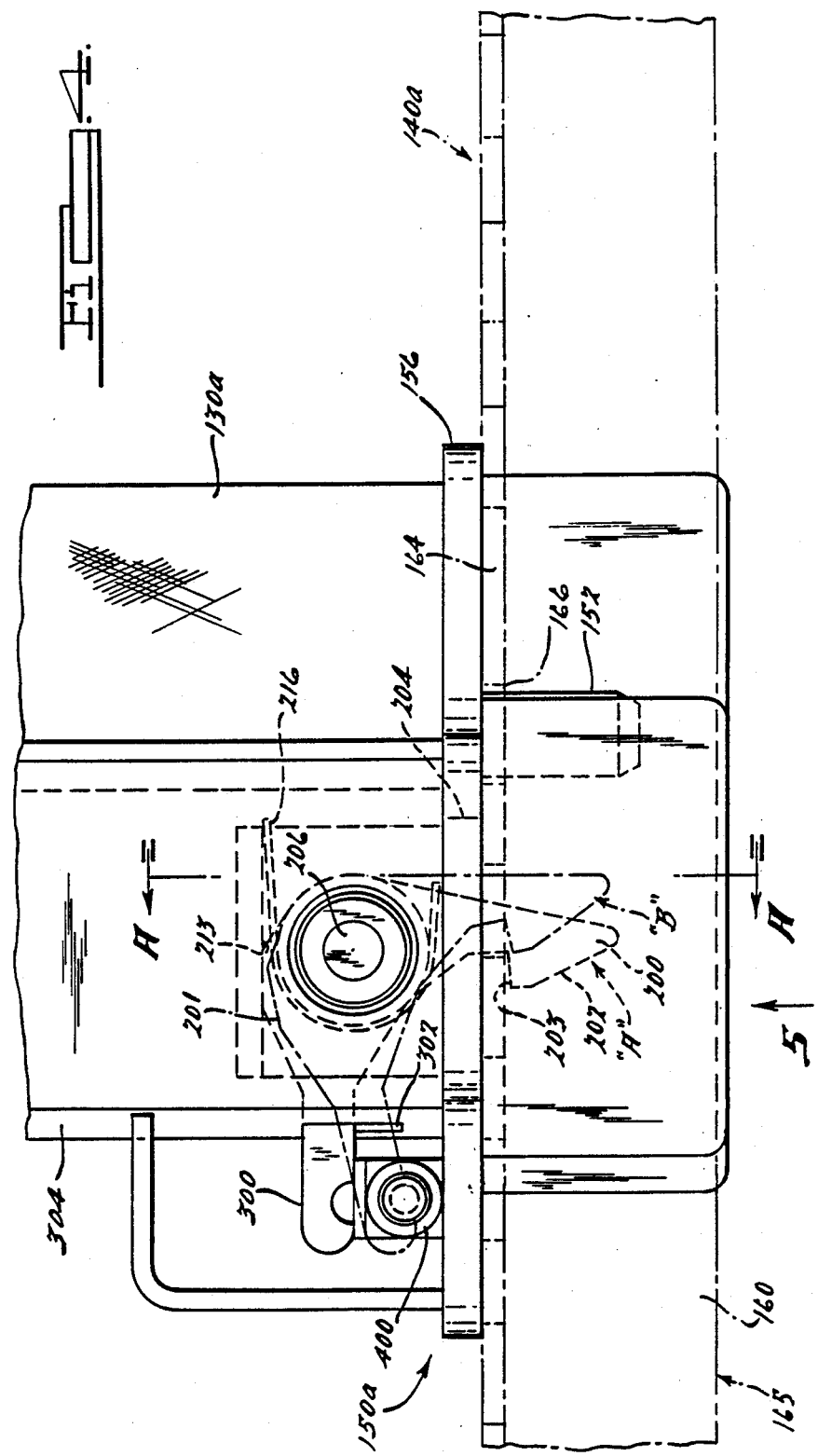
FIG. 4 is a top plan view of a socket for quick connect and disconnect of the wheel lift system wheel cradles.

Referring now to FIG. 4, when slid laterally inward of socket assembly 150a, the guide pin 152 of the socket assembly 150a enters one of the square positioning holes 166 of the latching plate 164 so as to enter the outer tube 160 of the side arm member 165. Further, the identically dimensioned square positioning holes 166 are spaced along the peripheral wall of the side arm 165 such that the camming surface 202 of the latch 200 carried within the socket 150a and extending through the access hole 204 in the end plate 156 engages the peripheral edge surface of a positioning hole 166 upon entrance of the guide pin 152 into the adjacent positioning hole 166 so as to permit coupling of the wheel cradle member 140a to the end of the cross arm assembly 120.

A more detailed discussion of an illustrative embodiment of the quick connect/disconnect socket coupling arrangement between a wheel cradle and the cross arm is best set forth with reference to FIGS. 4, 5 and 6. In FIG. 4, latch 200 is shown in two alternative positions. In the first position, denoted as Position "A", latch 200 has its engaging notch 203 surrounding a portion of the inner peripheral wall of the latching plate 164, the engaging notch 203 passes through a positioning hole 166 on the latching plate 164 and into the inner cavity of the outer tube 160 of the side arm 165. Position "A" represents the locked position generally referred to as the "snap-locked" arrangement. In this position, latch 200 is shown rotated toward the inner surface of the latching plate 164, the rotation being effected about an axis passing through the center of a latch pivot pin 206. Latch 200 is biased to the "snap-locked" position via a torsion spring 216 surrounding a cylindrical mandrel portion 224 of the latch 200 through which latch pivot pin 206 is axially disposed. Latch 200 is limited in its clockwise angular swing generated from the torsion spring 216 by latch stop angle 201 of latch 200 mechanically engaging a vertical retaining surface 213. This limited angular motion corresponds to the "snap-locked" position of latch 200 so as to ensure proper positioning of latch 200 during the coupling operation. Latch 200 additionally comprises a ramp angle or camming surface 202 against which a peripheral edge surface of the positioning hole 166 bears upon laterally inwardly sliding motion of side arm member 165. Upon such inward motion, the peripheral edge surface of the positioning hole 166 will ride up camming surface 202, thereby forcing latch 200 to pivot about pivot pin 206 until the engaging notch 203 is encountered, whereupon latch 200 will, under the force of torsion spring 216, snap back to the locked position thereby releasably coupling side arm member 165 into socket assembly 150a. Latch 200 is limited in its angular swing counterclockwise by the release lever arm 300 of the latch 200 contacting the plunger-type release mechanism 400.

In the "snap-locked" position, latch release lever arm 300 of latch 200 will protrude through access slot 302 formed in outer cross member tube 304 for manual access and movement whenever it is desired to release side arm member 165 from its socket. Such release, denoted as Position "B" in FIG. 4, will be effected upon a counterclockwise rotation of latch release lever arm 300 of latch 200 while concurrently maintaining downward depression of the plunger release mechanism 400 so as to disengage engaging notch 203 from the inner surface of latching plate 164, thereby enabling the outward retraction in a lateral direction of wheel cradle member 140a.

Figure 5:
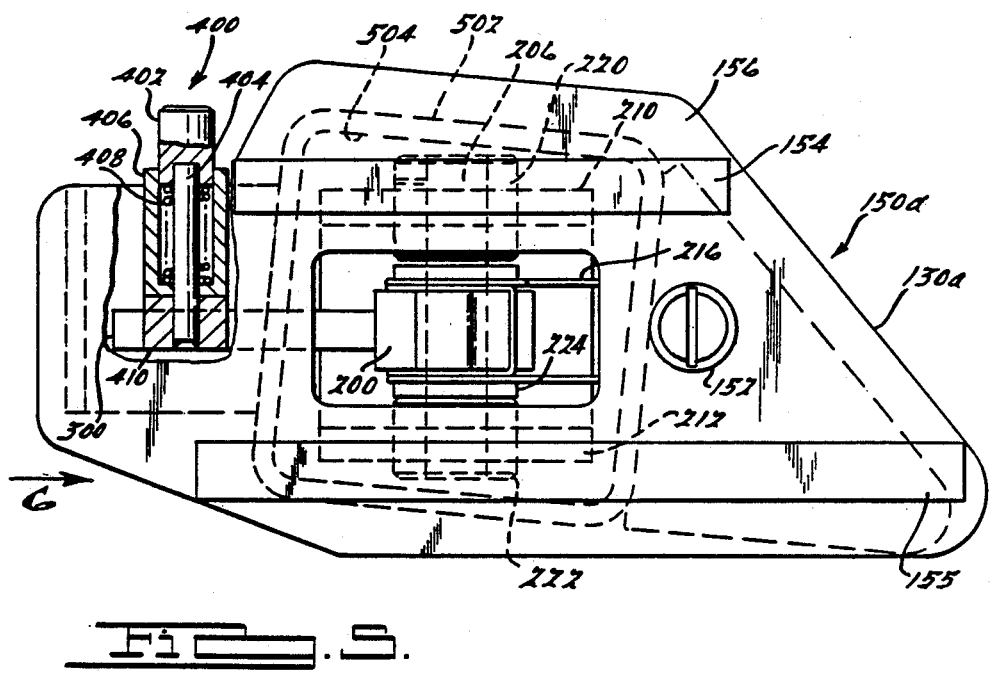
FIG. 5 is a side view taken along arrow 5 of FIG. 4.
Figure 6:
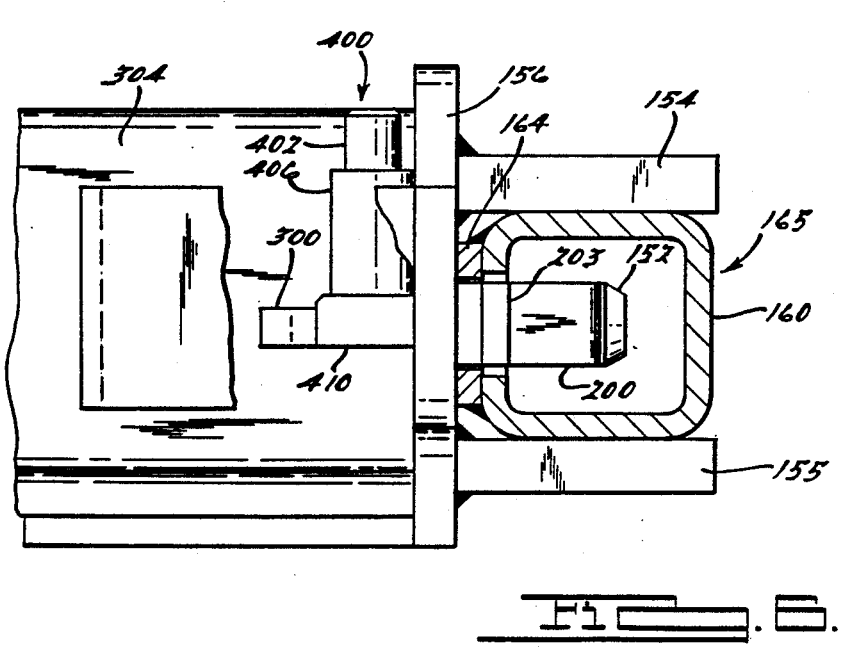
FIG. 6 is an end view taken along arrow 6 of FIG. 5.

With reference to FIGS. 4, 5, and 6, the plunger-type release mechanism 400, mounted on the rear surface of the end plate 156 and in close proximity to the release lever arm 300 of the latch 200, comprises a plunger button 402 threadably connected to a plunger shaft 404. The plunger button 402 and shaft 404 coaxially slide within a spring holder 406 within which a compression spring 408 is mounted. Coupled to the shaft 404 extending through the lower surface of the spring holder 406 is a stop block 410. The latch release lever arm 300 of the latch 200 is pivotally biased by the force of torsion spring 216 so as not to contact the stop block 410 when the side arm member 165 is coupled to the socket 150a. When the wheel cradle 140 is coupled to the socket 150, rotation of the release lever arm 300 in a direction toward the plunger mechanism 400 and opposed to the bias of the torsion spring 216 will permit the lever arm 300 to make contact with the stop block 410. However, this rotational motion of the lever arm 300 is insufficient to disengage the engaging notch 203 of the latch 200 from the inner surface of the latching plate 164, thereby not permitting release or decoupling of the wheel cradle 140. Whenever disconnection of the wheel cradle member 140 is desired, concurrent manual actuation of the plunger mechanism 400 and the release lever arm 300 will be required. Depression of the plunger button 402 will produce corresponding motion of the shaft 404 and the stop block 410 in a downward direction. This downward motion, positions the stop block 410 so as to allow additional manual counterclockwise rotation of the release lever arm 300 to matingly engage the plunger shaft 404. The additional rotation of the release lever arm 300 into mating contact with the plunger shaft 404 acts to disengage the engaging notch 203 and camming surface 202 of the latch 200 from the inner surface of latching plate 164 of the side arm 165, thereby enabling the outward retraction in a lateral direction of the wheel cradles 140 from the sockets 150.

The "snap-lock" action of the latch 200 upon positive location and introduction of a positioning hole 166 of the side arm 165 over the guide pin 152 horizontally extending from the socket 150, provides a self-locking feature. Disconnection of the wheel cradles 140 is not possible without the concurrent downward depression of the plunger mechanism 400 and the manual counterclockwise rotation of the release lever arm 300 so as to prevent premature disconnection of the wheel cradle members 140 during towing.

As seen from FIGS. 2, 4, 5 and 6, the socket is basically formed by the intersection of top plate member 154, end plate member 156, and bottom plate member 155, thereby forming a substantially rectanguloid cavity having a laterally outwardly facing open surface for mating receipt of the side arm member 165.

Welded to a rear surface of end plate member 156 is an outer cross arm tube or sleeve 502 of cross arm assembly 120 having an inner cross arm tube receiving chamber 504. Additionally, welded to end plate member 156 is an end of approach plate 130a. The outer cross arm tube 502 telescopically receives an inner tube (not specifically shown) for sliding engagement therewith whereby the entire weldment of the socket assembly 150a and approach plate 130a can slide on the inner cross tube of the cross arm assembly 120 for accommodating various wheel axle width of a vehicle to be towed.

As seen in FIG. 7, latch pivot pin 206 is carried in the socket disposed through two retaining plates 210 and 212 horizontally welded between the rear vertical surface of end plate 156 and the vertically aligned retaining plate 213, via pivot pin bosses 220 and 222, respectively. Surrounding latch pivot pin 206 between bosses 220 and 222 is the mandrel portion 224 of latch 200 over which the torsion spring 216 is mounted, as previously described with reference to FIG. 4.

With the arrangement as shown in FIGS. 2–7, allowing quick connect "snap-locked" coupling via laterally inward sliding of the side arm member 165 relative to ends of the cross arm assembly 120 enables easy use of the apparatus of the invention in those situations where side clearance adjacent outer side surfaces of the wheels of the towed vehicle is not available. Wheel support arm 190 may be provided with appropriately shaped surfaces matching the general outer contour of the towed vehicle wheel such that the wheels may be appropriately grasped even in the increased upward position of the wheel cradles required in the towing situation where the curb height exceeds five inches.

Adjustment of the length of the wheel cradle members 140 is accomplished by utilizing different positioning holes 166 for coupling the wheel cradles 140 to their respective sockets 150 and cross arm assembly 120. The outer cross tubes of cross arm assembly 120 are locked in chosen positions by T-handle set screws and have built-in safety locks for preventing inadvertent removal of the outer cross tubes from the inner tube of the cross arm assembly.

The invention has been described with reference to an illustrative embodiment, the details of which are given for the sake of example only. The scope and spirit of the invention is defined by the appended claims.

What is claimed is:

1. In a wheel lift towing system having a cross arm assembly and a wheel cradle member including a side arm extending transversely of the cross arm assembly, apparatus for enabling quick connection and disconnection of the side arm to and from the cross arm assembly, the apparatus comprising:

socket means on one of an end portion of the cross arm assembly and a lateral peripheral surface of the side arm, the socket means including a socket opening shaped for receipt of one of the lateral peripheral surface of an associated side arm and the end portion of the cross arm assembly, such that the wheel cradle members may be releasably coupled to the cross arm assembly via an inwardly lateral sliding action of the side arm substantially parallel to a longitudinal axis of the cross arm assembly while the side arm extends transversely to the longitudinal axis, latch means in one of the side arm and the socket means and latch engaging means in the other of the side arm and the socket means for coupling the side arm to the socket means, the latch means comprising a pivotable latching member coupled for rotation about pivot means, said pivot means for biasing the latching member to a latched position, the pivotable latching member including an engaging notch adjacent to a camming surface of the latching member and lever means for permitting rotation of the pivotable latching member away from its latched position, and the latch engaging means comprising a series of positioning holes each shaped to permit engagement of the camming surface of the pivotable latching member with a surface surrounding the positioning hole so as to cause rotation of the pivotable latching member such that the engaging notch of the pivotable latching member captures a portion of the surface surrounding the positioning hole upon the inwardly lateral sliding action of the side arm, thereby releasably coupling the side arm to the socket means, the series of positioning holes providing means for adjusting the length of the side arm relative to the cross arm assembly.

2. The apparatus of claim 1 further comprising guide means associated with the pivotable latching member such that the inwardly lateral sliding action of the side arm provides entry of the guide means into a positioning hole aligning the pivotable latching member so as to permit engagement of the camming surface of the pivotable latching member with the surface surrounding an adjacent positioning hole so as to cause rotation of the pivotable latching member such that the engaging notch of the pivotable latching members captures a portion of the surface surrounding the positioning hole upon the inwardly lateral sliding action of the side arm, thereby releasably coupling the side arm to the socket means.

3. The apparatus of claim 1 further comprising means for decoupling the wheel cradle member from the socket means, the means for decoupling comprising plunger means for permitting additional rotation of the pivotable latching member lever means to an unlatched position, the plunger means including a movable shaft coupled to a stop block, the shaft normally biased such that the stop block prevents the additional rotation of the lever means required for disengaging the pivotable latching member from its latched position, actuation of the plunger means results in movement of the stop block to a position so as to permit additional rotational motion of the pivotable latching member lever means into mating contact with the shaft, thereby positioning the pivotable latching member in its unlatched position so as to permit outwardly lateral sliding motion of the side arm to decouple each wheel cradle member from its respective cross arm assembly end.

4. The apparatus of claim 3, wherein each socket means is coupled to an end of the cross arm assembly and has a socket opening shaped for receipt of a portion of a lateral peripheral surface of an associated side arm.

5. The apparatus of claim 3, wherein each socket means is coupled to a lateral surface of a side arm of the wheel cradle member and has a socket opening outwardly of the lateral surface of the side arm shaped for receipt of an end portion of the cross arm assembly.

6. The apparatus of claim 1, wherein the latching member is integrally associated with the socket means, the latching member pivotably moveable within the socket opening.

7. The apparatus of claim 6, wherein the latch engaging means comprises a series of positioning holes provided on a peripheral surface of the side arm.

8. The apparatus of claim 2, wherein the guide means comprises a guide pin provided within the socket opening adjacent to the pivotable latching member.

9. In a wheel lift towing system having a cross arm assembly coupled to a towing vehicle and having first and second approach plates for engaging respective first portions of circumferentially extending road engaging surfaces of first and second wheels of a vehicle to be towed, a towed vehicle wheel engaging apparatus comprising:

first and second wheel cradle members each comprising a side arm and a transversely extending wheel support arm for engaging respective second portions of the circumferentially extending road engaging surfaces;

first and second sockets for direct coupling receipt of respective lateral peripheral surfaces of first and second side arms of respective wheel cradle members to opposite ends of the cross arm assembly, each of the first and second sockets including a socket opening shaped for receipt of one of a lateral peripheral surface of an associated side arm and an end portion of the cross arm assembly, such that each wheel cradle member may be releasably coupled to its respective cross arm assembly end via an inwardly lateral sliding action of the side arm, substantially parallel to a longitudinal axis of the cross arm assembly while the side arm extends transversely to said longitudinal axis, thereby placing the side arm adjacent to an outer side surface of a towed wheel;

a pivotable latching member and guide pin carried within each socket, the pivotable latching member coupled for rotation about a pivot pin, said latching member having spring means for biasing said latching member to a latched position, the pivotal latching member further defining an engaging notch adjacent to a camming surface and a lever arm extending through an outer cross tube member of the socket and protruding through to an exterior surface thereof;

a series of positioning holes passing through the lateral peripheral surface of the side arm to be coupled to the cross arm assembly and positioned so as to permit entry of the guide pin and concurrent engagement of the camming surface of the pivotal latching member with the adjacent positioning hole to cause rotation of the pivotal member to its latched position thereby coupling the side arm to the socket;

a plunger mechanism having a spring-biased shaft coupled at its lower end portion to a stop block, the stop block normally biased so as to engage the pivotable member lever arm upon manual rotation of said lever arm in a direction opposed to the pivotable member spring means and toward the stop block, the stop block acting to restrict the rotational motion of the lever arm toward an unlatched position so as to maintain coupled engagement of the side arm to the socket; and whereby, downward depression of the spring-biased plunger shaft acts to correspondingly lower the stop block from its rotation restricting position such that additional rotational motion of the lever arm is permitted enabling the lever arm to matingly contact the plunger shaft, the additional rotation into mating contact acting to disengage the pivotable latching member from the side arm positioning hole such that the pivotable latching member is rotated to its unlatched position, thereby permitting outwardly lateral sliding motion of the side arm so as to decouple each wheel cradle member from its respective cross arm assembly rod.

10. The apparatus of claim 9, wherein the pivotable latching member coupled for rotation about a pivot pin and biased to a latched position by spring means is further defined as including a lever arm extending through the socket and protruding through to the exterior thereof, so as to be in close proximity to the plunger mechanism, and wherein the series of spaced positioning holes pass through the lateral peripheral surface of the side arm to be coupled to the cross arm assembly and positioned so as to engage the camming surface to cause rotation of the pivotable latching member to a position enabling the engaging notch to capture a wall surface of the side arm whenever the side arm is moved into the socket with said inwardly lateral sliding motion.

11. The apparatus of claim 10, wherein the bias of the spring means acting on the pivotable latching member will operatively maintain coupled association of the wheel cradle to its respective socket.

12. The apparatus of claim 10, wherein the positioning holes passing through a peripheral surface of the side arm are positioned to permit direct entrance of the guide pin into a positioning hole while concurrently permitting engagement of the camming surface of the pivotable latching member with a peripheral edge surface of an adjacent positioning hole, so as to cause rotation of the pivotable latching member to a position enabling the engaging notch to capture an inner wall surface of the side arm whenever the side arm is moved into the socket with an inwardly lateral sliding motion, thereby releasably coupling said wheel cradle member to its respective cross arm assembly.

13. The apparatus of claim 12, wherein positioning holes are spaced on the peripheral side arm surface to permit a plurality of adjustment positions of the wheel cradle to accommodate towed wheels of various sizes.

14. The apparatus of claim 10, wherein the pivotable latching member lever arm may be rotated so as to contact the stop block of the plunger mechanism without permitting disengagement of the wheel cradle from its respective arm assembly.

15. The apparatus of claim 9, wherein each socket further comprises an end plate member, a top plate member, and a bottom plate member, said top plate and bottom plate members perpendicularly coupled to said end plate member so as to define a cavity within which the side arm of the wheel cradle member may be releasably coupled to the respective cross arm assembly ends via the lateral sliding action.

16. The apparatus of claim 9, wherein each wheel cradle member further comprises a side arm coupled to a wheel support arm so as to be substantially L-shaped.

* * * * *